United States Patent [19]

Zibell et al.

[11] Patent Number: 5,124,160
[45] Date of Patent: Jun. 23, 1992

[54] GRANULATION OF ACTIVE INGREDIENTS USING POLYVINYL ACETATE AND ALCOHOL

[75] Inventors: Steven E. Zibell, Tinley Park; Kevin B. Broderick, Berwyn, both of Ill.

[73] Assignee: Wm. Wrigley Jr. Company, Chicago, Ill.

[21] Appl. No.: 633,395

[22] Filed: Dec. 21, 1990

[51] Int. Cl.$^5$ ............................................... A23G 3/30
[52] U.S. Cl. ........................................ 426/3; 426/5; 426/94; 426/548; 426/453; 426/804; 424/48
[58] Field of Search ........................................ 426/3-6, 426/94, 96, 804, 548, 658, 453

[56] References Cited

U.S. PATENT DOCUMENTS 3,795,744  3/1974  Ogawa et al. ............................. 426/3
3,826,847  7/1974  Ogawa et al. ............................. 426/3

*Primary Examiner*—Jeanette Hunter
*Attorney, Agent, or Firm*—Willian Brinks Olds Hofer Gilson & Lione

[57] ABSTRACT

A method is disclosed for granulating active ingredients using a granulation which includes polyvinyl acetate, alcohol and modified cellulosic. Methods for adding granulated active ingredients to oral compositions, including chewing gum, are provided. A chewing gum composition containing granulated active ingredients is also provided.

27 Claims, 2 Drawing Sheets

GRANULATION OF ACTIVE INGREDIENTS USING POLYVINYL ACETATE AND ALCOHOL

BACKGROUND OF THE INVENTION

The present invention relates to a method for granulating active ingredients for use in oral compositions, including chewing gum. More particularly, the present invention relates to a granulation which includes polyvinyl acetate, alcohol, and a modified cellulosic.

Extensive efforts have been undertaken to control and sustain release of active ingredients in oral compositions, particularly chewing gum. Many active ingredients are not stable in the presence of excess moisture, temperature, and various chemicals. Certain sweeteners, especially aspartame, are water-soluble and readily degradable. Aspartame tends to be readily degraded by flavors, particularly aldehyde flavors. Active ingredients also tend to have initial bursts of flavor or sweetness.

Various methods have been investigated to control the release of active ingredients. Fluid bed coating, fiber spinning, and spray drying are methods known in the art. These methods are designed to coat and protect the ingredient so there is prolonged release of sweetener or flavor as opposed to an overpowering initial release. Another method involves granulating or agglomerating ingredients into a granular matrix which also provides for a more controlled release of ingredient.

Another method for controlling release involves encapsulation of active ingredients. Encapsulation methods utilizing polyvinyl acetate ("PVAc") with a plasticizer are useful for protecting sweeteners in chewing gum. Encapsulation with PVAc is effective because PVAc is not water soluble and is not readily degradable. Furthermore, PVAc is a food-safe ingredient. This method, however, is very costly and requires expensive machinery and skilled labor.

SUMMARY OF THE INVENTION

One embodiment of the present invention is a method for granulating active ingredients for use in oral compositions. The active ingredients are granulated or agglomerated as follows. A quantity of granulating fluid comprising polyvinyl acetate ("PVAc") dissolved in alcohol is added to powdered active ingredients and a modified cellulosic to form a damp granulation. The damp granulation is dried until hardened, and ground to a desired particle size. The particles of granulated active ingredient are then incorporated into an oral composition formulation.

Another embodiment of the present invention is a method for preparing chewing gum and other oral compositions containing granulated active ingredients.

Another embodiment of the present invention is a granulating fluid comprising polyvinyl acetate and alcohol.

Another embodiment of the present invention is a granulation comprising polyvinyl acetate, alcohol, and modified cellulosic.

Another embodiment of the present invention is a granulated active ingredient comprising polyvinyl acetate, modified cellulosic, and active ingredient.

A further embodiment of the present invention is a chewing gum composition that includes gum base, softener, sweetener, and granulated active ingredient.

The present invention is advantageous in that it achieves a highly desirable active ingredient release over at least ten minutes. The granular matrix is a support matrix through which granulated active ingredients may be released gradually and continuously. The granular matrix also reduces the surface area of granulated active ingredients exposed to solvents. These advantages are provided with a relatively simple and inexpensive method for granulating active ingredients using polyvinyl acetate, alcohol, and modified cellulosic. In particular, the present invention can be carried out in a short time, using simple and inexpensive equipment. The present invention is also well suited for batch processing.

It should be noted that the phrase "active ingredient" as used herein is intended to refer to various types of sweeteners, salts, food acids, and medicaments. Examples of these active ingredients include, but are not limited to, high intensity sweeteners such as aspartame, alitame, acesulfame-K, Sucralose®, saccharin and its salts, cyclamic acid and its salts, dihydrochalones, thaumatin, monellin and glycyrrhizan and its acid and salt forms, salts such as sodium chloride and potassium chloride, and food acids such as adipic, malic, citric, and fumaric acid.

It should be further noted that all percent values ("%") represent weight percent.

The above-described advantages of the present invention, as well as others, will become apparent from the following description which, when taken in conjunction with the accompanying FIGURES, discloses presently preferred methods of the present invention.

DETAILED DESCRIPTION OF THE PREFERRED EMBODIMENTS

Figure 1:
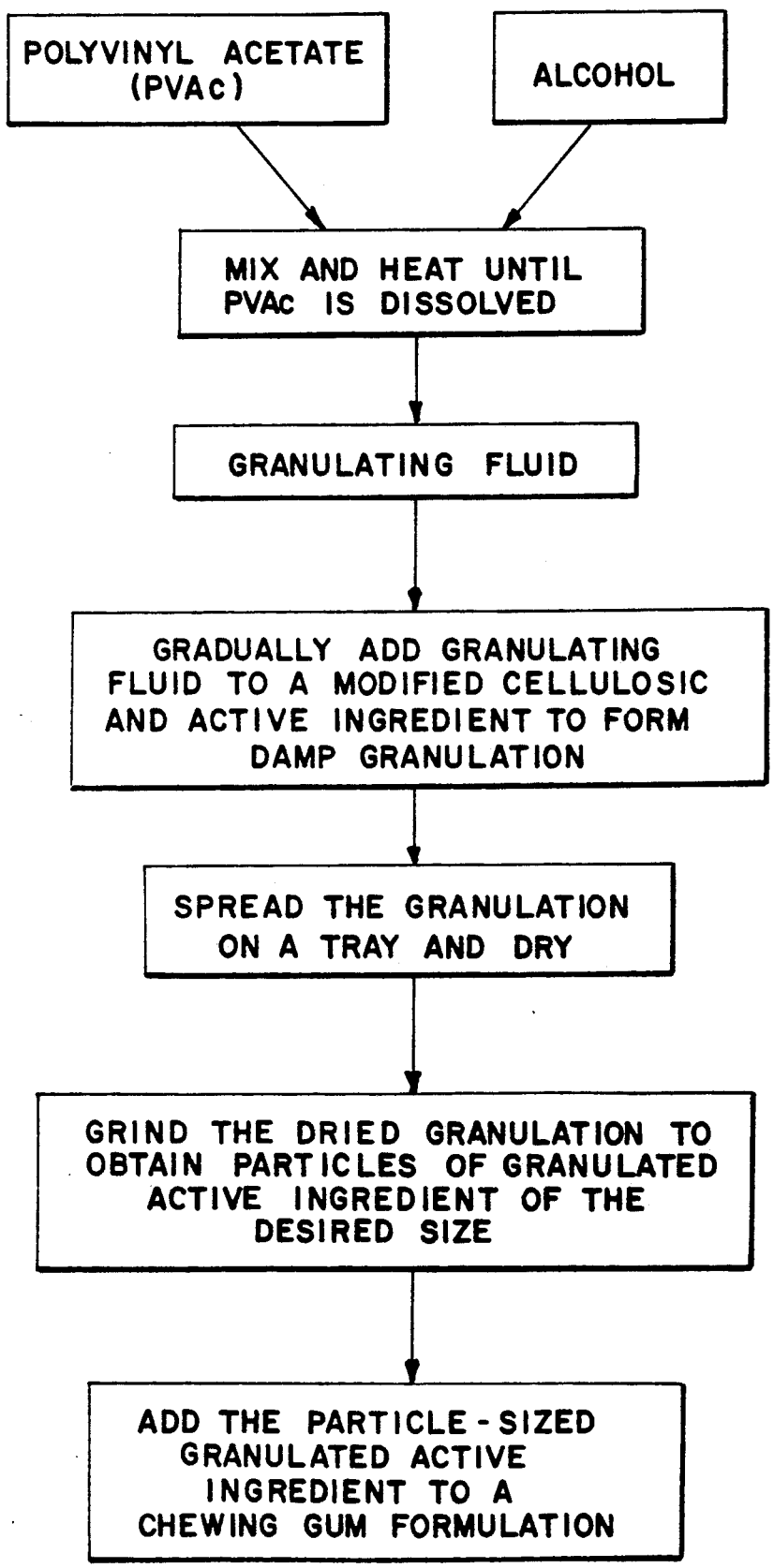
FIG. 1 shows a schematic representation of a preferred method of the present invention.

The present invention is a method for granulating active ingredients. This method utilizes a granulation comprising polyvinyl acetate, alcohol and a modified cellulosic. The granulation is mixed with an active ingredient, dried, and particle-sized to produce granulated active ingredient. Referring to the drawings, FIG. 1 is a diagram illustrating the steps in the method of one of the preferred embodiments of the present invention. First, a granulating fluid is prepared by dissolving low molecular weight PVAc (approximately 10,000–20,000 MWU) in alcohol. The granulating agent PVAc is not water soluble but is soluble in an alcohol solvent. In the most preferred embodiment of the present invention, the alcohol is methanol, ethanol, or a combination thereof.

Preferably, the PVAc and alcohol are combined in a 1:1 ratio and heated until the PVAc is dissolved. It is most desirable to heat the mixture to 120° F. (49° C.) for approximately 1.5 hours. The granulating fluid is then gradually added to a powdered mixture of ingredients which include a modified cellulosic and an active ingredient to form a granulation.

The preferred modified cellulosic for use in the granulation is ethylcellulose. Ethylcellulose is derived from cellulose, a naturally-occurring polymer, and aids in binding the active ingredient as well as in controlling the release of the active ingredient. Ethylcellulose is particularly useful in the present invention because it is soluble in alcohol and is a desirable granulating agent for use in oral compositions. It is colorless, odorless, and tasteless. In a most preferred embodiment of the invention, Ethocel ® is added to the granulation. The use of other modified cellulosics is also contemplated. Preferably, the amount of modified cellulosic added to the granulation is about 5% to about 40%. Most preferably, the amount of modified cellulosic added is about 15% to about 30%.

The active ingredients added to the granulation of the present invention include but are not limited to sweeteners, salts, food acids, and medicaments. Examples of these active ingredients are high intensity sweeteners such as aspartame, alitame, acesulfame-K, Sucralose ®, saccharin and its salts, cyclamic acid and its salts, dihydrochalones, thaumatin, monellin, and glycyrrhizan and its acid and salt forms, salts such as sodium chloride and potassium chloride, and food acids such as adipic, malic, citric, and fumaric acid.

In a most preferred embodiment of the present invention, the active ingredient is a high intensity sweetener. Example I describes a method for granulating the high intensity sweetener, Sucralose ®. In another preferred embodiment, the granulated active ingredient is a salt. Example II describes a method for preparing granulated sodium chloride.

The active ingredient is generally about 25% to about 85% of the granulation. Preferably, the active ingredient added is about 40% to about 70%.

The granulating fluid, modified cellulosic, and active ingredient are mixed until homogenous and a damp, dust-free, and crumbly mixture is formed. The optimum time for mixing can be determined visually. At this stage, the granulation should coalesce when pressed together.

After mixing, the granulation is dried to remove all traces of the alcohol solvent. Preferably, the granulation is removed from the mixing bowl and spread onto trays prior to drying. Drying is most preferably accomplished by heating the granulation in a convection oven for about 24 hours.

After drying, the granulation is generally characterized as being in the form of hard, dry lumps of various sizes and shapes. The dried granulation is then ready to be ground to the desired range of particle sizes of granulated active ingredient. This can be accomplished is several ways. Most preferably, the dried granulation is fed into a cryogenic grinder which comminutes it into smaller particles. The grinder or other device used is preferably equipped with a screen which will pass the desired particle range. Desired particle size ranges of the present invention are about 0.0001" to about 0.1". Preferably, the particle size ranges from about 0.0017" (325 mesh) to about 0.0165" (40 mesh) when added to a chewing gum formulation.

The particle-sized, granulated active ingredient is then ready for incorporation into formulations for oral compositions. In a preferred embodiment of the present invention, the granulated active ingredient is added to a chewing gum composition. The preferred chewing gum composition is a sugar-sweetened chewing gum to intensify and extend the sweetness and flavor thereof. Alternatively, the present invention may also be used in a sugarless gum to intensify and extend the sweetness thereof.

Preferably, the granulated active ingredient is added to a chewing gum formulation early in the mixing process. Optimum levels of granulated active ingredient may vary from about 0.1% to about 3% in a chewing gum formulation. Preferably, the level of granulated active ingredient added is about 0.5% to about 1.5%. The present invention, however, is not limited to these approximate ranges of granulated active ingredient added to chewing gum formulations. The level of granulated active ingredient added will depend upon the final concentration of the active ingredient in the granulation.

In general, a chewing gum comprises a water-soluble bulk portion, a water-insoluble chewable gum base portion and typically, water-insoluble flavor ingredients. The water-soluble portion dissipates with a portion of the flavor over time during chewing. The gum base portion is retained in the mouth throughout the chew.

The insoluble gum base generally comprises elastomers, resins, fats and oils, waxes, softeners and inorganic fillers. The insoluble gum base constitutes between about 5% to about 95% of the gum, and more preferably about 20% to about 30%.

The gum base typically also includes a filler component. The filler component may be calcium carbonate, magnesium carbonate, talc, dicalcium phosphate, and the like. The filler may constitute between about 5% to about 60% of the gum base. Preferably, the filler comprises about 5% to about 50% of the chewing gum base. The gum base also contains softeners, including glycerol monostearate and glycerol triacetate. Further, gum bases may also contain additional ingredients such as anti-oxidants, colors, and emulsifiers. The present invention contemplates using any commercially acceptable gum base.

The water-soluble portion of chewing gum may further comprise softeners, sweeteners, and flavors and combinations thereof. The softeners are added to the chewing gum in order to optimize the chewing ability and mouth feel of the gum. Softeners, also known in the art as plasticizers, generally constitute about 0.1% to about 15% of the chewing gum. Softeners contemplated by the present invention include glycerin, lecithin and combinations thereof. Aqueous sweetener solutions such as those containing sorbitol, hydrogenated starch hydrolysates, corn syrup, and combinations thereof may be used as softeners and binding agents in gum.

Sweeteners contemplated by the present invention for use in chewing gum include both sugar and sugarless components. Sugar sweeteners generally include saccharide-containing components commonly known in the art and include, but are not limited to, sucrose, dextrose, maltose, dextrin, dried invert sugar, fructose, levulose, galactose, corn syrup solids and the like, alone or in any combination. Sugarless sweeteners include components with sweetening characteristics but are devoid of the commonly known sugars and comprise, but are not limited to, sugar alcohols such as sorbitol, mannitol, xylitol, hydrogenated starch hydrolysates, maltitol, and the like, alone or in any combination. Also contemplated for direct addition to the gum are high intensity sweeteners such as aspartame, Sucralose ®, cyclamate, acesulfame-K, dihydrochalones, alitame, and saccharin.

Those persons skilled in the art will recognize that any combination of sugar/sugarless sweeteners may be employed in the chewing gum. Further, those skilled in the art will recognize a sweetener may be present in a chewing gum in whole or in part as a water-soluble bulking agent, and that the softener may be combined with a sweetener such as an aqueous sweetener solution.

Depending upon the desired release profile of the active ingredient, the granulated active ingredients in the present invention may also be used in combination with ingredients which are not granulated, coated, or encapsulated, or with ingredients granulated, coated, or encapsulated with other materials or other methods.

A flavoring agent may be present in the chewing gum in an amount from about 0.1% to about 10.0% and preferably from about o.5% to about 3% of the gum. Flavoring agents may comprise essential oils, synthetic flavors, or mixtures thereof including but not limited to oils derived from plants and fruits such as citrus oils, fruit essences, peppermint oil, spearmint oil, clove oil, oil of wintergreen, anise and the like. Artificial flavoring components are also contemplated. Those skilled in the art will recognize that natural and artificial flavoring agents may be combined in any sensorially acceptable blend. All such flavors and flavor blends are contemplated by the present invention.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting the gum base and adding it to the running mixer. The base may also be melted in the mixer itself. Color may also be added at this time. A softener such as glycerin may then be added next along with the syrup and a portion of bulking agent. Further portions of the bulking agents may be added to the mixer. Preferably, the flavor ingredients are added to the gum mixture near the end of the mixing process. The entire mixing procedure takes from about 5 minutes to 15 minutes, however, longer mixing times may be required. Those persons skilled in the art will recognize that many variations of the above described procedure may be followed.

In another embodiment of the present invention, the granulated active ingredient may be added to other oral compositions such as pharmaceuticals. Preferably, the granulated active ingredient comprises about 0.1% to about 3% of the oral composition.

EXAMPLE 1

Preparation of A Granulated Sweetener

A granulating fluid was prepared by dissolving low molecular weight PVAc in methanol (MeOH) at a 1:1 ratio. The mixture was heated to 120° F. (49° C.) for approximately 1.5 hours until the PVAc was completely dissolved.

Next, a granulation containing the high intensity sweetener, Sucralose ®, was prepared as follows and included the ingredients below:
    ethylcellulose 45 g
    Sucralose ® 105 g
    1:1 PVAc/MeOH 21.5 g The above quantities of ethylcellulose and Sucralose ® were placed in a mixing bowl. The granulating fluid was added slowly to these ingredients during mixing until the composition became homogeneous, damp, and crumbly. The damp granulation was spread onto a tray and heated gently for 24 hours in a convection oven to remove all traces of the alcohol solvent.

The hard, dried granulation was particle-sized with a grinder to produce particles of granulated sweetener of about 0.05" in size.

EXAMPLE 2

Preparation of A Granulated Salt

A granulated active ingredient was prepared as described in Example 1 except that the active ingredient added to the granulation was the salt, sodium chloride. The granulation comprised the following formula:
    ethylcellulose 30 g
    sodium chloride 70 g
    1:1 PVAc/MeOH 39 g

EXAMPLE 3

Preparation of a Chewing Gum Composition Containing a Granulated Sweetener

Two laboratory-scale batches of chewing gum were prepared and evaluated by trained panelists. In the experimental batch, the particle-sized, granulated sweetener described in Example 1 was added to a spearmint-flavored chewing gum formulation with the ingredients, weight percentages, and mixing schedule listed below:

| Ingredient | % by Weight | Time (Minutes) |
|---|---|---|
| Sugar | 53.645 | 0 |
| Base | 22.26 | 0 |
| Syrup | 5.13 | 0 |
| Glycerin | 2.0 | 0 |
| Dextrose | 13.41 | 0 |
| CaCO$_3$ | 2.0 | 0 |
| Granulated Sweetener | 0.110 | 0 |
| 10% Salt Solution | 0.10 | 3 |
| Flavor (spearmint) | 1.35 | 5 |
| | 100.00 | 10 |

The above ingredients were added into the gum mixture at the time indicated in the mixing schedule. The total mixing time was ten minutes. The gum was then rolled out and cut into uniform pieces for testing.

The control batch of chewing gum was prepared in the same manner except that 53.7% sugar was added, and 0.06% neat Sucralose ® was added instead of 0.11% granulated Sucralose ®.

Figure 2:
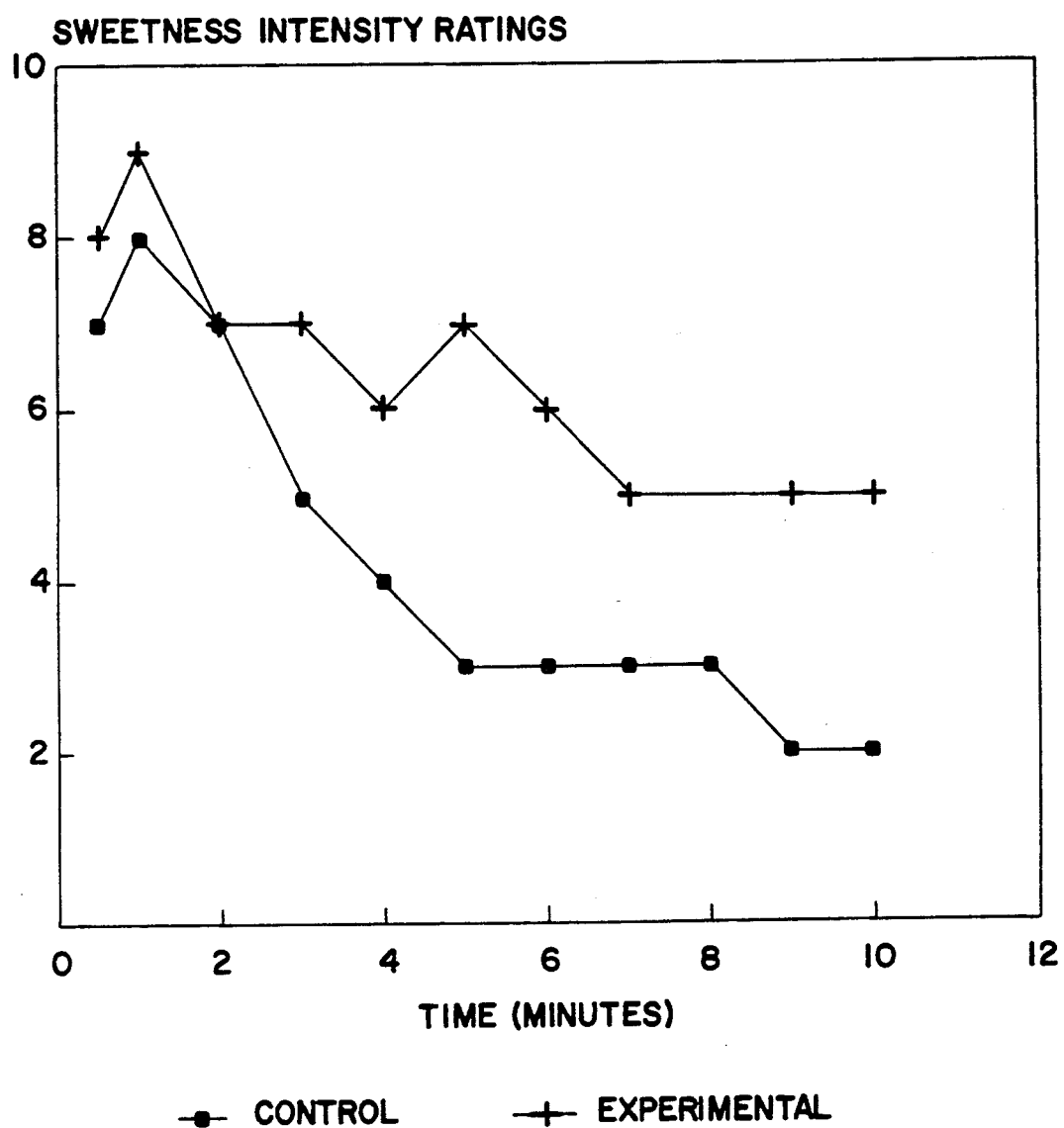
FIG. 2 shows a graph illustrating the release profile of a granulated sweetener in chewing gum.

The two batches of chewing gum were evaluated by sensory testing of four trained panelists. Panelists reported flavor and sweetness release by a rating of high, moderate, low, and nothing at various intervals for 10 minutes. A rating of "high+" indicated a most intense sweetness, and a rating of "nothing" indicated no sweetness was perceptible. The results are shown in FIG. 2.

The panelists unexpectedly experienced moderate sweetness in the experimental gum as long as 10 minutes. This is exceptionally long lasting sweetness as compared to the control chewing gum that received a low rating as early as 4 minutes.

In summary, a relatively simple and inexpensive method has been described for controlling the release of active ingredients in oral compositions, including chewing gum. Although specific embodiments and examples have been described herein, it should be born in mind that these have been provided by way of explanation and illustration and that the present invention is not limited thereby. Modifications which are within the ordinary skill in the art to make are considered to lie within the scope of the invention as defined by the following claims, including all equivalents.

We claim:

1. A method of preparing granulated active ingredients comprising the following steps of:
   dissolving polyvinyl acetate in alcohol to form a granulating fluid;
   mixing a quantity of said granulating fluid with a quantity of active ingredient and modified cellulosic, the quantities being limited thereby to produce a damp granulation;
   drying the damp granulation; and
   particle-sizing the dried granulation to obtain granulated active ingredient particles having a particle size range of about 0.0001 inch to about 0.1 inch.

2. The method of claim 1, wherein the polyvinyl acetate is about 10,000 MWU to about 20,000 MWU.

3. The method of claim 1, wherein the alcohol is an ethanol.

4. The method of claim 1, wherein the alcohol is a methanol.

5. The method of claim 1, wherein the alcohol is a combination of ethanol and methanol.

6. The method of claim 1, wherein the polyvinyl acetate and alcohol are mixed at a 1:1 ratio.

7. The method of claim 1, wherein the active ingredient is a high intensity sweetener.

8. The method of claim 7, wherein the high intensity sweetener is Sucralose ®.

9. The method of claim 1, wherein the modified cellulosic is ethylcellulose.

10. The method of claim 1, wherein the granulating fluid is about 10% to about 30% of the granulation.

11. A method of preparing a chewing gum containing granulated active ingredient comprising the following steps of:
    providing gum ingredients comprising gum base, softener, flavor, and sweetener ingredients;
    dissolving polyvinyl acetate in alcohol to form a granulating fluid;
    mixing a quantity of said granulating fluid with a quantity of active ingredient and modified cellulosic, the quantities being limited thereby to produce a damp granulation;
    drying the damp granulation;
    particle-sizing the dried granulation to obtain granulated active ingredient particles having a particle size range of about 0.0001 inch to about 0.1 inch; and
    mixing the particle-sized granulated active ingredient with the gum ingredients so that the granulated active ingredient comprises about 0.1% to about 3% by weight of the chewing gum.

12. The method of claim 11, wherein the polyvinyl acetate is about 10,000 MWU to about 20,000 MWU.

13. The method of claim 11, wherein the alcohol is an ethanol.

14. The method of claim 11, wherein the alcohol is a methanol.

15. The method of claim 11, wherein the alcohol is a combination of ethanol and methanol.

16. The method of claim 11, wherein the polyvinyl acetate and alcohol are mixed at a 1:1 ratio.

17. The method of claim 11, wherein the active ingredient is a high intensity sweetener.

18. The method of claim 17, wherein the high intensity sweetener is Sucralose ®.

19. The method of claim 11, wherein the modified cellulosic is ethylcellulose.

20. The method of claim 11, wherein the granulating fluid is about 10% to about 30% of the granulation.

21. A chewing gum composition comprising granulated active ingredient, wherein said granulated active ingredient comprises polyvinyl acetate, modified cellulosic, and active ingredient.

22. The chewing gum composition of claim 21, wherein said granulated active ingredient is about 0.1% to about 3% by weight of the gum composition.

23. An oral composition comprising granulated active ingredient, wherein said granulated active ingredient comprises polyvinyl acetate, modified cellulosic, and active ingredient.

24. The oral composition of claim 23, wherein said granulated active ingredient is about 0.1% to about 3% by weight of the oral composition.

25. A granulated active ingredient comprising polyvinyl acetate, modified cellulosic, and active ingredient.

26. A granulation comprising polyvinyl acetate, alcohol, and modified cellulosic.

27. A granulating fluid comprising polyvinyl acetate dissolved in alcohol.

* * * * *

UNITED STATES PATENT AND TRADEMARK OFFICE
CERTIFICATE OF CORRECTION

PATENT NO. : 5,124,160

DATED : June 23, 1992

INVENTOR(S) : Steven E. Zibell et al.

It is certified that error appears in the above-identified patent and that said Letters Patent is hereby corrected as shown below:

ON THE TITLE PAGE

Under the heading "References Cited" and below "U.S. PATENT DOCUMENTS", please add --4,992,280  2/1991  Yung Chu et al. ...... 426/5--.

Column 3, line 46, please delete "is" and substitute therefor --in--.

Column 5, line 11, please delete "o.5%" and substitute therefor --0.5%--.

Signed and Sealed this

Twenty-ninth Day of March, 1994

Attest:

BRUCE LEHMAN

Attesting Officer

Commissioner of Patents and Trademarks